US012641658B1

(12) United States Patent
Marupaduga et al.

(10) Patent No.: US 12,641,658 B1
(45) Date of Patent: May 26, 2026

(54) USE OF SECONDARY-NODE LOADING AS BASIS TO CONTROL WHETHER TO USE BLIND ADDITION OR RATHER THRESHOLD-BASED ADDITION WHEN CONFIGURING DUAL CONNECTIVITY

(71) Applicant: T-Mobile USA, Inc., Bellevue, WA (US)

(72) Inventors: Sreekar Marupaduga, Overland Park, KS (US); Rajveen Narendran, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 501 days.

(21) Appl. No.: 16/549,458

(22) Filed: Aug. 23, 2019

(51) Int. Cl.
| | |
|---|---|
| *H04W 28/02* | (2009.01) |
| *H04B 17/318* | (2015.01) |
| *H04W 24/10* | (2009.01) |
| *H04W 36/22* | (2009.01) |
| *H04W 76/15* | (2018.01) |

(52) U.S. Cl.
CPC .......... *H04W 76/15* (2018.02); *H04B 17/318* (2015.01); *H04W 24/10* (2013.01); *H04W 28/0205* (2013.01); *H04W 36/22* (2013.01)

(58) Field of Classification Search
CPC . H04W 76/15; H04W 28/0205; H04W 24/10; H04W 28/08; H04B 17/318
See application file for complete search history.

(56) References Cited

U.S. PATENT DOCUMENTS

| | | | |
|---|---|---|---|
| 9,900,925 B2 | 2/2018 | Fujishiro et al. | |
| 10,149,170 B2 * | 12/2018 | Youn | H04W 88/08 |
| 2015/0043492 A1 * | 2/2015 | Baek | H04W 56/0005 |
| | | | 370/329 |
| 2016/0338039 A1 * | 11/2016 | Van Der Velde | H04W 74/0833 |
| 2017/0071021 A1 * | 3/2017 | Jin | H04W 8/22 |
| 2017/0215076 A1 * | 7/2017 | Youn | H04W 88/08 |
| 2018/0098258 A1 * | 4/2018 | Annam | H04W 4/02 |
| 2018/0279218 A1 * | 9/2018 | Park | H04W 36/08 |
| 2019/0037625 A1 * | 1/2019 | Shih | H04W 48/20 |
| 2019/0230515 A1 * | 7/2019 | Quan | H04W 24/08 |

(Continued)

OTHER PUBLICATIONS

3GPP TSG RAN WG3#81 bis; Venice, Italy, Oct. 7-11, 2013; R3-131711; Source: Title: Signaling Impact over S1/Xn; Agenda Item:20.2; Document for: Discussion and Decision (Year: 2013).*

*Primary Examiner* — Derrick W Ferris
*Assistant Examiner* — M Mostazir Rahman
(74) *Attorney, Agent, or Firm* — Lee & Hayes, P.C.

(57) ABSTRACT

A mechanism for controlling configuration of dual connectivity for a UE that has a first connection with a first access node. The first access node could make a determination whether a level of load of a second access node with which the UE does not yet have a connection is predefined threshold high. If not, then the first access node could apply blind addition, in which the first access node works to add for the UE the second connection without requiring as a condition precedent the UE reporting being in threshold strong coverage of the second access node. Whereas, if so, then the first access node could instead apply threshold-based addition, in which the first access node works to add for the UE the second connection if and when the UE reports being in threshold strong coverage of the second access node.

16 Claims, 4 Drawing Sheets

(56)          References Cited

U.S. PATENT DOCUMENTS

2019/0394820 A1 *  12/2019  Patil ..................... H04W 48/20
2020/0163144 A1 *   5/2020  Ryoo ................... H04W 76/30
2020/0351971 A1 *  11/2020  Fiorani ............... H04B 17/318
2020/0359282 A1 *  11/2020  da Silva ........... H04W 36/0058
2020/0413350 A1 *  12/2020  Yang .................... H04W 52/28
2021/0037482 A1 *   2/2021  Shin .................. H04W 72/0413
2022/0166838 A1 *   5/2022  Ma ........................ H04W 76/10

* cited by examiner

Figure 2:
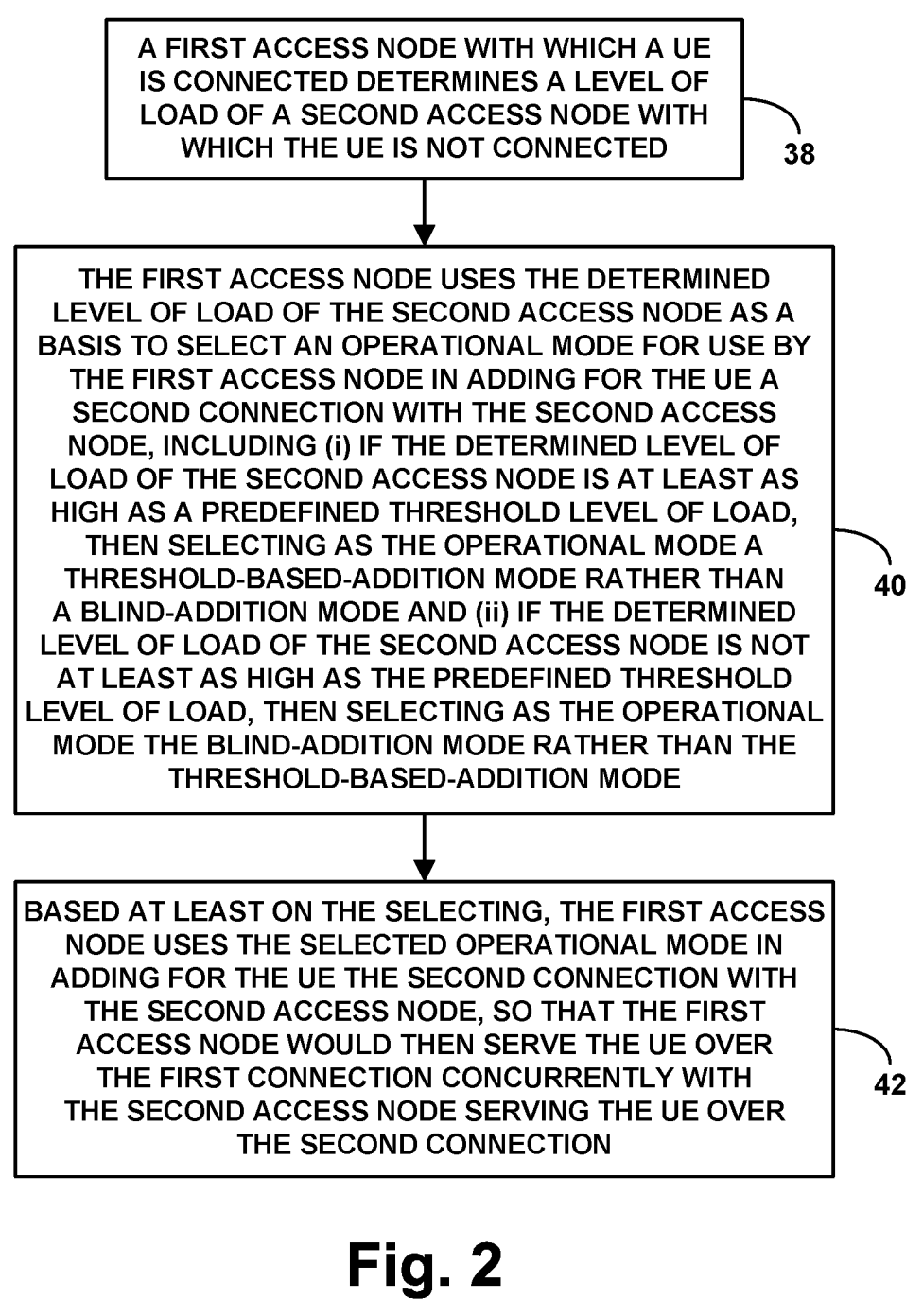

A FIRST ACCESS NODE WITH WHICH A UE IS CONNECTED DETERMINES A LEVEL OF LOAD OF A SECOND ACCESS NODE WITH WHICH THE UE IS NOT CONNECTED

38

THE FIRST ACCESS NODE USES THE DETERMINED LEVEL OF LOAD OF THE SECOND ACCESS NODE AS A BASIS TO SELECT AN OPERATIONAL MODE FOR USE BY THE FIRST ACCESS NODE IN ADDING FOR THE UE A SECOND CONNECTION WITH THE SECOND ACCESS NODE, INCLUDING (i) IF THE DETERMINED LEVEL OF LOAD OF THE SECOND ACCESS NODE IS AT LEAST AS HIGH AS A PREDEFINED THRESHOLD LEVEL OF LOAD, THEN SELECTING AS THE OPERATIONAL MODE A THRESHOLD-BASED-ADDITION MODE RATHER THAN A BLIND-ADDITION MODE AND (ii) IF THE DETERMINED LEVEL OF LOAD OF THE SECOND ACCESS NODE IS NOT AT LEAST AS HIGH AS THE PREDEFINED THRESHOLD LEVEL OF LOAD, THEN SELECTING AS THE OPERATIONAL MODE THE BLIND-ADDITION MODE RATHER THAN THE THRESHOLD-BASED-ADDITION MODE

40

BASED AT LEAST ON THE SELECTING, THE FIRST ACCESS NODE USES THE SELECTED OPERATIONAL MODE IN ADDING FOR THE UE THE SECOND CONNECTION WITH THE SECOND ACCESS NODE, SO THAT THE FIRST ACCESS NODE WOULD THEN SERVE THE UE OVER THE FIRST CONNECTION CONCURRENTLY WITH THE SECOND ACCESS NODE SERVING THE UE OVER THE SECOND CONNECTION

Figure 3:
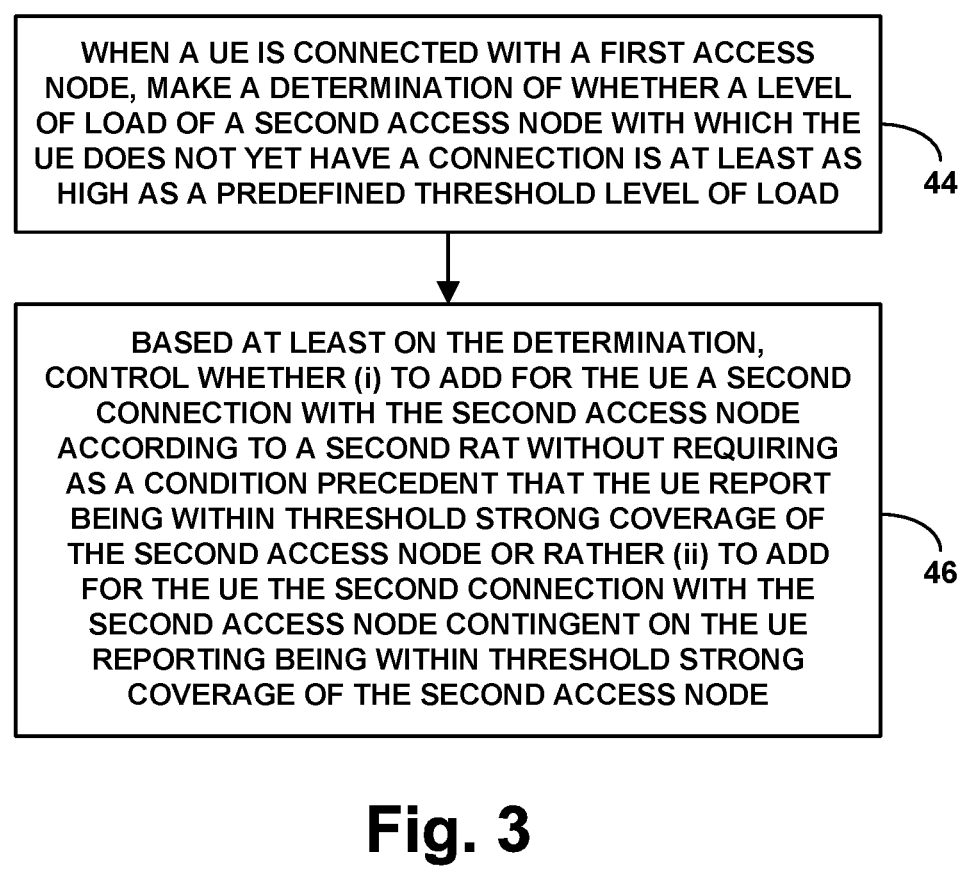

WHEN A UE IS CONNECTED WITH A FIRST ACCESS NODE, MAKE A DETERMINATION OF WHETHER A LEVEL OF LOAD OF A SECOND ACCESS NODE WITH WHICH THE UE DOES NOT YET HAVE A CONNECTION IS AT LEAST AS HIGH AS A PREDEFINED THRESHOLD LEVEL OF LOAD

44

BASED AT LEAST ON THE DETERMINATION, CONTROL WHETHER (i) TO ADD FOR THE UE A SECOND CONNECTION WITH THE SECOND ACCESS NODE ACCORDING TO A SECOND RAT WITHOUT REQUIRING AS A CONDITION PRECEDENT THAT THE UE REPORT BEING WITHIN THRESHOLD STRONG COVERAGE OF THE SECOND ACCESS NODE OR RATHER (ii) TO ADD FOR THE UE THE SECOND CONNECTION WITH THE SECOND ACCESS NODE CONTINGENT ON THE UE REPORTING BEING WITHIN THRESHOLD STRONG COVERAGE OF THE SECOND ACCESS NODE

USE OF SECONDARY-NODE LOADING AS BASIS TO CONTROL WHETHER TO USE BLIND ADDITION OR RATHER THRESHOLD-BASED ADDITION WHEN CONFIGURING DUAL CONNECTIVITY

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the access nodes and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

Overview

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of a user-plane bearer, including an access-bearer that extends between the access node and a core-network gateway system providing connectivity with a transport network and a data-radio-bearer (DRB) that extends over the air between the access node and the UE.

Once the UE is connected and attached, the access node could then serve the UE with packet-data communications.

For instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet data for transmission on the transport network, the UE could buffer the data, pending transmission of the data over the UE's DRB to the access node, and the UE could transmit to the access node a scheduling request that carries a buffer status report (BSR) indicating the quantity of data that the UE has buffered for transmission. With the example air-interface configuration, the access node could then allocate uplink PRBs in an upcoming subframe to carry at least some of the data from the UE and could transmit to the UE a scheduling directive indicating those upcoming PRBs, and the UE could responsively transmit the data to the access node in those PRBs.

In practice, the UE could also regularly evaluate the quality (e.g., based on reference-strength strength) of its coverage from its serving access node and could transmit an associated channel quality indicator (QCI), which the access node could use as a basis to set a modulation and coding scheme (MCS) to be used for downlink and uplink the air-interface communication between the access node and the UE. Higher quality coverage could correspond with a higher-order MCS, which could allow use of fewer air-interface resources (e.g., PRBs) to communicate given bearer data, whereas lower quality coverage could correspond with a lower-order MCS, which could require use of more air-interface resources to communicate given bearer data.

Further, for both the downlink and uplink air-interface communication, if the receiving end does not successfully receive a scheduled data communication from the transmitting end (which might happen if coverage conditions are relatively poor), the receiving end could responsively send to the transmitting end a negative acknowledgement (NACK), and the transmitting end could then responsively engage in re-transmission using air-interface resources of an upcoming subframe.

As the industry advances from one generation of RAT to the next, networks and UEs may be configured to support service on multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G radio and a 5G radio, and the 4G radio could be served by a 4G access node (evolved Node-B (eNB)) concurrently with the 5G radio being served by a 5G access node (next generation Node-B (gNB)). This arrangement could help support transition from 4G technology to 5G technology and could also facilitate higher peak data rate of communication by allowing data to be multiplexed over 4G and 5G connections, among possibly other benefits.

More generally, dual connectivity could encompass connectivity on two or more RATs concurrently, to facilitate technology transitions or for other purposes. Dual connectivity can thus be distinguished from standalone connectivity, where a UE is served on just one RAT, such as just 4G LTE for instance.

In some dual-connectivity arrangements, an access node operating under a first RAT could serve as a master node (MN), responsible for RRC signaling with the UE, responsible for coordinating setup and teardown of dual-connectivity service for the UE, and functioning as an anchor point for core-network control signaling related to the dual-connected UE. And an access node operating under a second RAT could serve as a secondary node (SN), to provide increased data capacity for the UE for instance. With EN-DC, for example, a 4G eNB could operate as the MN (referred to as an MeNB), and a 5G gNB could operate as the SN (referred to as an SgNB).

These access nodes could be collocated in a common cell site, possibly sharing an antenna tower, and could be configured to provide coverage in generally the same direction and of generally the same scope as each other. Alternatively, the access nodes could be at separate cell sites but still configured to provide substantially overlapping or coterminous coverage.

When the UE enters into coverage of such a system, the UE could initially scan for coverage under the first RAT and discover threshold strong coverage of the MN, and the UE could responsively engage in signaling as discussed above to establish for the UE an RRC connection. Further, the UE could engage in attach signaling with a core-network controller, via the UE's established RRC connection, and the core-network controller and MN could coordinate establishment for the UE of an access bearer and DRB as noted above. Here, the DRB and/or other service parameters that the MN configures to support the MN's air-interface service of the UE could define for the UE a first-RAT connection.

The MN could then serve the UE in a first-RAT standalone mode (i.e., under just the first RAT) with packet-data communications as described above. For instance, when the core network has data to send to the UE, the data could flow to the MN, and the MN could schedule and provide transmission of the data on downlink PRBs to the UE, with the UE monitoring for scheduling directives and reading the data from the downlink PRBs. And when the UE has data to send, the UE could transmit a scheduling directive to the MN, the MN could schedule transmission of the data on uplink PRBs from the UE, and the UE could monitor for scheduling directives and transmit the data on the scheduled uplink PRBs.

In addition, once the UE is connected with the MN, the MN could engage in a process to coordinate setup of dual-connectivity for the UE, so that the UE can be served concurrently by the MN and the SN.

To do so, the MN could first engage in an SN-addition process to add for the UE a second-RAT connection with the SN, so that the MN and SN can then cooperatively provide the UE with dual-connectivity service over their respective connections with the UE. In an example implementation, for instance, the MN could transmit to the SN an SN-addition request message, providing RRC and DRB configuration information and other information for the second-RAT connection, and the SN could then responsively allocate resources for the second-RAT connection and reply to the MN an SN-addition-request acknowledge message. The MN could then transmit to the UE an RRC connection-reconfiguration message providing the UE with parameters of the second-RAT connection. And the UE could respond to the MN with a reconfiguration-complete message, which the MN could forward to the SN. Further, the UE could then engage in random-access signaling with the SN so as to complete establishment of the second-RAT connection for the UE.

Further, for some dual-connectivity implementations, the MN could also engage in signaling process to transfer the UE's access-bearer from being between the gateway system and the MN to instead being between the gateway system and the SN. For instance, the MN could include in its SN-addition request to the SN information about the access bearer, and the MN could transmit to the core-network controller an access-bearer modification request and the core-network controller could update the gateway system so as to transfer the access-bearer from the MN to the SN.

With dual-connectivity so configured by way of example, the MN and SN could then serve the UE with packet-data communications over their respective connections with the UE, with each access node coordinating air-interface communication in the manner described above. For instance, downlink data could flow over the UE's access bearer from the gateway system to the SN, the SN could transmit a portion of the data over the UE's second-RAT connection to the UE, and the SN could send another portion of the data to the MN, which the MN could transmit to the UE over the UE's first-RAT connection. Likewise, when the UE has data to transmit, the UE could transmit a portion of the data over the UE's first-RAT connection to the MN, which the MN could forward to the SN and the SN could transmit over the UE's access bearer to the gateway system, and the UE could transmit another portion of the data over the UE's second-RAT connection to the SN, which the SN could transmit over the UE's access bearer to the gateway system.

While the above process of configuring dual-connectivity for a UE may work well practice, one technical issue with the process is how the MN would determine in the first place that the second-RAT connection with the SN should be established for the UE, and thus that the MN should engage in the SN-addition process to configure that second-RAT connection for the UE.

Here, the MN may have a choice of at least two different processes to apply. One option, referred to as "blind addition," involves the MN adding the second-RAT connection without requiring as a condition precedent that the UE report being within threshold strong coverage of the SN. And the other option, referred to as "threshold-based addition," involves the MN adding the second-RAT connection if and only if the UE reports being within threshold strong coverage of the SN, i.e., contingent on the UE reporting being within threshold strong coverage of the SN.

With blind addition, the MN could simply proceed to add the second-RAT connection for the UE (e.g., engage in signaling to facilitate that addition), on possible grounds that the MN and SN provide coverage of generally the same direction and scope as each other so that, if the UE is within sufficiently strong coverage of the MN, the UE is likely also within sufficiently strong coverage of the SN. Whereas, with threshold-based addition, the MN could transmit to the UE a measurement object that would cause the UE to report to the MN if and when the UE detects at threshold strong coverage of the SN under the second-RAT, and the MN would proceed to add the second-RAT connection for the UE if and when the UE provides that measurement report.

Disclosed herein is a mechanism to control which SN-addition process an MN will use in a given instance, such as to control whether the MN will apply the blind-addition process or rather the threshold-based-addition process.

In accordance with the disclosure, the MN will select between applying the blind-addition process and applying the threshold-based-addition process, with the selection being based at least on a load-level of the SN—such as how many UEs are connected with the SN and/or what the SN's level of PRB-utilization is, among other possibilities. And based on this selection, the MN will then operate in a mode in which the MN will apply the selected process rather than the other process.

In practice, the MN could operate in a first, default mode in which the MN is set to apply the blind-addition process, rather than the threshold-based-addition process, with respect to the SN. But if and when (e.g., at times when) the load-level of the SN is threshold high, the MN could instead operate in a second mode in which the MN is set to apply the threshold-based-addition process, rather than the blind-addition process, with respect to the SN. Further, in the second mode, the MN could also adjust the applicable threshold for coverage strength of the SN, with the adjustment or threshold level being based on how loaded the SN is, such as applying a higher coverage-strength threshold if and when the SN is more heavily loaded.

Optimally, applying the threshold-based-addition process when the SN is threshold highly loaded could help avoid or minimize instances in which secondary connectivity with the SN is configured for UEs that are in relatively poor coverage of the SN. And avoiding or minimizing those instances could help limit the extent of retransmissions and use of lower-order MCS for UEs served by the SN, thus helping to control the level of SN resource utilization. Whereas, applying the blind-addition process when the SN is not threshold heavily loaded could optimally help facilitate quick SN addition.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 2 is a flow chart depicting an example method in accordance with the disclosure.

FIG. 3 is another flow chart depicting an example method in accordance with the disclosure.

DETAILED DESCRIPTION

An example implementation will now be described in the context of a system that supports 4G LTE service, 5G NR service, and EN-DC service. However, it should be understood that the disclosed principles could extend to apply in other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by processing unit executing instructions stored in non-transitory data storage, along with associated circuitry or other hardware, among other possibilities.

Figure 1:
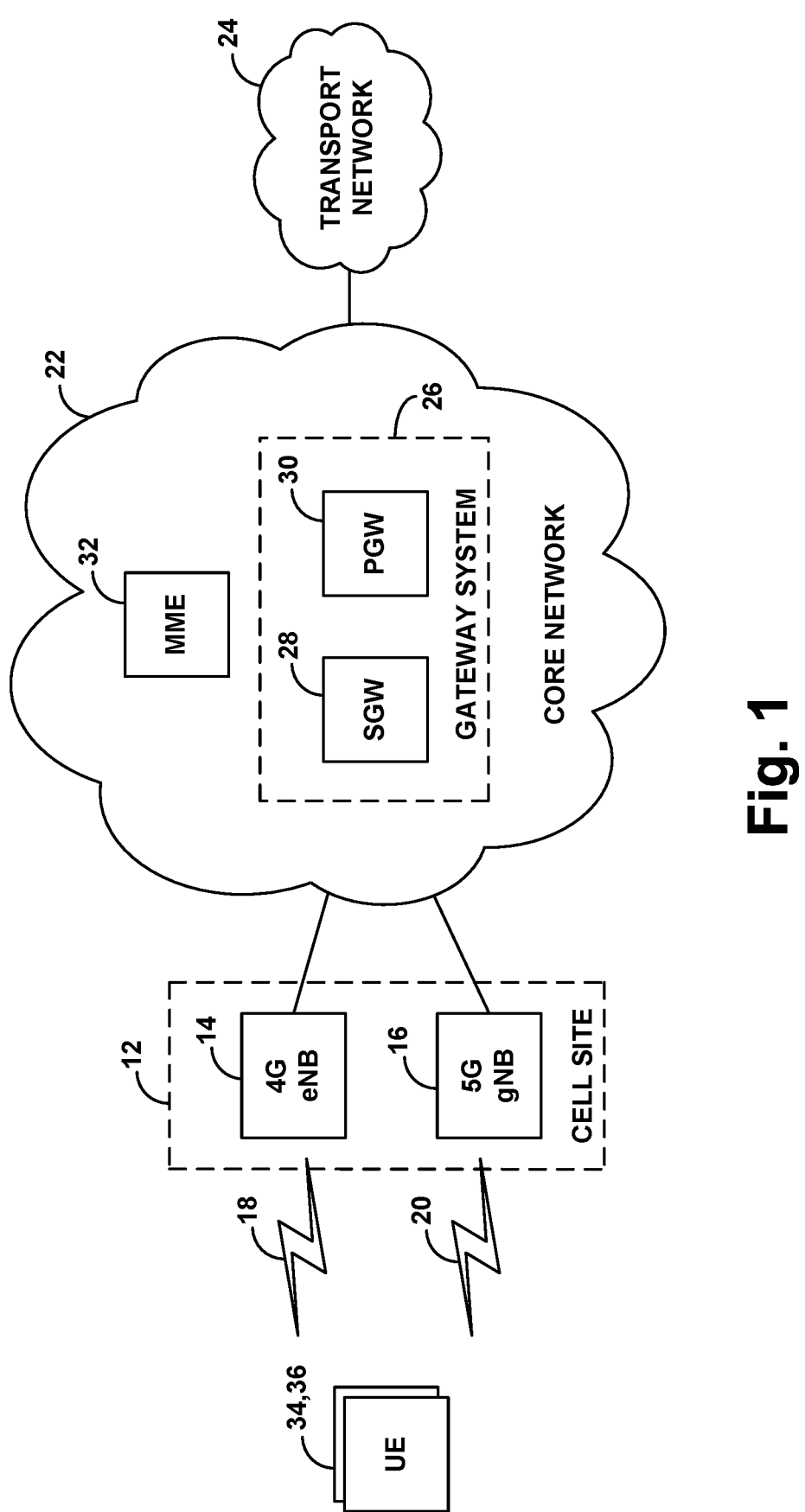
FIG. 1 is a simplified block diagram of an example network arrangement in which aspects of the present disclosure can be implemented.

FIG. 1 is a simplified block diagram of an example network arrangement having a cell site 12 that includes a 4G eNB 14 and a 5G gNB 16. These access nodes could be macro access nodes of the type configured to provide a wide range of coverage or could take other forms, such as small cell access nodes, repeaters, femtocell access nodes, or the like, possibly configured to provide a smaller range of coverage.

Each access node could have a respective antenna structure that is configured to transmit and receive electromagnetic signals in a region defined by an antenna pattern or radiation pattern. The antenna pattern defines a scope of coverage in which the access node can engage in downlink transmission to UEs and receive uplink transmission from UEs. In particular, the antenna pattern may define a main lobe and could be characterized by an azimuth angle, an elevation angle, and a beamwidth. In polar coordinates, the azimuth angle defines a direction of radiation of the main lobe within a horizontal plane, as an angle of rotation around a vertical axis (in relation to North (zero degrees) for instance), the elevation angle defines a direction of radiation of the main lobe within a vertical plane, as an angle of rotation around a horizontal axis (in relation to the horizon for instance), and the beamwidth defines an angular width of the main lobe within the horizontal plane, typically measured between half-power (−3 dB) points of the main lobe for instance.

In practice, the antenna structures of the access nodes could be collocated with each other, such as by being mounted on a common antenna tower and/or being in a common housing. Further, the azimuth angle, elevation angle, and beamwidth of either or each access node's antenna pattern could be structured so that the two access nodes provide coverage of the same or similar direction and scope as each other, i.e., largely coterminous coverage, even though the access nodes may be operating on different frequencies with different path loss than each other. There could also be some variation between the access nodes' respective coverage areas.

Each access node could provide coverage on one or more carriers according to a respective radio access technology. For instance, the 4G eNB 14 could provide 4G coverage 18 on one or more 4G carriers, and the 5G eNB 16 could provide 5G coverage 20 on one or more 5G carriers.

In an example implementation, the respective coverage on each carrier could be divided over time into frames, subframes, timeslots, and symbol segments, and could be divided over carrier frequency bandwidth into subcarriers. As a result, the respective coverage could define an array of time-frequency resource elements, in which subcarriers can be modulated to carry data communications. Further, in each subframe, these resource elements could be divided into groups defining the PRBs noted above, which could be allocable by the associated access node on an as-needed basis to carry data communications as noted above. And certain resource elements per subframe could be reserved for other purposes as further discussed above.

The 4G air interface and 4G service provided by 4G eNB 14 could differ from the 5G air interface and 5G service provided by the 5G gNB 16 in various ways now known or later developed. For example, one may provide variable subcarrier spacing, and the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In the example arrangement of FIG. 1, the 4G eNB 14 and 5G gNB 16 are both interfaced with a core network 22, which could be an evolved packet core (EPC) network, a next generation core (NGC) network, or another network including components that may provide connectivity with at least one transport network 24, such as the Internet. In an example implementation as shown, the core network includes a gateway system 26 having a serving gateway (SGW) 28 and a packet-data network gateway (PGW) 30, which provides user-plane connectivity with the transport network 24. Further, the core network includes a mobility management entity (MME) 32, which serves as a core-network controller. Other core-network arrangements are also possible.

FIG. 1 also illustrates one or more example UEs 34, 36 within coverage of 4G eNB 14 and 5G gNB 16. Each of these UEs could take any of the forms noted above, among other possibilities. Further, some or all of the UEs could be equipped with a 4G LTE radio, a 5G NR radio, and associated circuitry and logic that enables the UEs to engage in 4G LTE service, 5G NR service, and EN-DC service. And some of the UEs might be equipped with just a 4G LTE radio and associated circuitry and logic that enables the UEs to engage in 4G LTE service, or just a 5G LTE radio and associated circuitry and logic that enables the UEs to engage in just 5G NR service.

In line with the discussion above, when a 4G-capable UE 34 initially enters into coverage of this network, the UE 34 could discover coverage of the 4G eNB 14, such as by scanning predefined 4G carriers to find a synchronization signal from the 4G eNB 14 and then determining that a reference signal from the 4G eNB 14 is strong enough to justify connecting. The UE could then engage in random-access signaling and RRC signaling with the 4G eNB 14 to establish an RRC connection, and the 4G eNB 14 could establish a context record indicating the state of the UE's 4G connection and service.

With its RRC connection established, the UE 34 could then transmit to the 4G eNB 14 an attach request message, which the 4G eNB 14 could forward to the MME 32 for processing. And upon authenticating and authorizing the UE for service, the MME 32 and 4G eNB 14 could coordinate setup for the UE 34 of at least one user-plane bearer. In particular, the MME 32 could engage in signaling with the 4G eNB 14 and the SGW 28 to coordinate setup for the UE 34 of an S1-U packet tunnel between the 4G eNB 14 and the SGW 28, and the SGW 28 could responsively engage in signaling with the PGW 30 to coordinate setup for the UE 34 of an associated S5 packet tunnel between the SGW 28 and the PGW 30. Further, the 4G eNB 14 could engage in signaling with the UE 34 to establish a DRB and other configuration parameters cooperatively defining a 4G connection for the UE 34.

As a last step of this attachment process, the 4G eNB 14 could also transmit to the UE 34 an RRC message carrying a UE-capability enquiry, and the UE 34 could respond to the 4G eNB 14 with a "UE capability information" information element (IE), which could indicate whether the UE 34 is EN-DC capable.

If the UE 34 is EN-DC capable, the 4G eNB 14 could then work to configure EN-DC service for the UE 34. In line with the discussion above, for instance, the 4G eNB 14, operating as MeNB, could first engage in process to add the 5G gNB 16 as an SgNB for the UE 34, such as by transmitting to the 5G gNB 16 an SgNB-Addition request to cause the 5G gNB to allocate resources for a 5G connection for the UE 34 on one or more 5G carriers, receiving an SgNB-Addition-Request acknowledge message from the 5G gNB 16, and engaging in associated RRC signaling with the UE 34, in response to which the UE 34 could then access and complete establishment of the 5G connection. Further, the 4G eNB 14 could engage in signaling as described above to transfer to the UE's access bearer to the 5G gNB as well.

The 4G eNB 14 and 5G gNB 16 could then provide the UE 34 with EN-DC service, concurrently serving the UE 34 over their respective connections with the UE 34. Namely, the 4G eNB 14 could allocate PRBs of its 4G air interface as needed to carry data over the 4G connection between the 4G eNB 14 and the UE 34, and the 5G gNB could allocate PRBs of its 5G air interface as needed to carry data over the 5G connection between the 5G gNB 16 and the UE 34.

In addition to the 4G eNB 14 and 5G gNB 16 thus providing this example UE 34 with EN-DC service, the 4G eNB 14 and 5G gNB 16 might also concurrently serve one or more other UEs 36 with EN-DC service, the 4G eNB 14 might also concurrently serve one or more other UEs 36 with standalone 4G service (e.g., where UEs connect with just the 4G eNB 14 possibly in the manner discussed above), and the 5G gNB 16 might also concurrently serve one or more other UEs 36 with standalone 5G service (e.g., where UEs connect with just the 5G gNB 16 possibly in the manner discussed above).

As a result, the 5G gNB 16 may have a varying level of load representing how busy or occupied the 5G gNB 16 is with respect to providing service. For present purposes, this level of load could relate to a level of congestion of one or more carriers on which the 5G gNB 16 may end up serving UE 34, which might be a single carrier on which the 5G gNB 16 operates and/or might be multiple carriers on which the 5G gNB 16 operates. And the level of load could be measured by various metrics, examples of which could include the quantity of UEs connected with the 5G gNB, and level of PRB utilization, such as percentage of PRBs allo- cated on the air interface on average over a recent sliding window of time or the like, among other possibilities.

In accordance with the present disclosure, as discussed above, the 4G eNB 14 could operate in either of at least two modes with respect to adding the 5G gNB 16 as a secondary node for providing EN-DC service: (i) a blind-addition-mode or (ii) a threshold-based-addition mode.

In the blind-addition mode, the 4G eNB 14 would simply proceed to add for the UE 34 the 5G connection with the 5G gNB 16 without requiring as a condition precedent that the UE 34 report being within threshold strong coverage of the 5G gNB 16. Whereas, in the threshold-based-addition mode, the 4G eNB 14 would require, as a condition precedent to adding that 5G connection for the UE 34, that the UE 34 reports being within threshold strong coverage of the 5G gNB 16.

Specifically with threshold-based-addition, for instance, the 4G eNB 14 could transmit to the UE 34 (e.g., in an RRC message) a B1 (inter-RAT) measurement object that directs the UE to scan for coverage of the 5G gNB 16 and/or of one or more carriers on which the 5G gNB 16 operates, and that designates at least one B1 measurement threshold. The B1 measurement threshold could be a minimum threshold level of reference signal receive power (RSRP) and/or reference signal receive quality (RSRQ) that the UE 34 has from the 5G gNB 16 as a condition for the UE 34 providing a B1 measurement report to the 4G eNB 14. For instance, the B1 measurement threshold could be RSRP on the order of at least −116 dBm to −95 dBm.

In line with the discussion above, the 4G eNB 14 could select which of at least these two modes to operate in, with the selection being based at least on the current load level of the 5G gNB 16. To facilitate, the 5G gNB 16 could peri- odically or otherwise report to the 4G eNB 14 the 5G gNB's current load level, through signaling over an inter-access-node interface such as an X2 interface for instance, or the 4G eNB 14 could otherwise determine the level of load of the 5G gNB (e.g., by querying an element management system (EMS) or the like that tracks such information). And the 4G eNB 14 could determine based on the most recent load level of the 5G gNB 16 whether the 4G eNB 14 should operate in the blind-addition mode with respect to the 5G gNB 16 or should rather operate in the threshold-based-addition mode with respect to the 5G gNB 16.

The 4G eNB 14 could make this selection each time the 4G eNB 14 receives a load report from the 5G gNB 16. Alternatively or additionally, the 4G eNB 14 could make the selection at the time the UE 34 connects with the 4G eNB 14 and/or otherwise when the 4G eNB 14 is going to configure EN-DC service for the UE 34.

Further, as discussed above, the 4G eNB 14 could gen- erally operate by default in the blind-addition mode and, based on the load level of the 5G gNB 16 being at least threshold high, could transition from operating in the blind-addition mode to operating instead in the threshold-based-addition mode. And based on subsequently determining that the load level of the 5G gNB 16 is no longer at least threshold high, the 4G eNB 14 could then revert to operate in the default, blind-addition mode.

In either case, the 4G eNB 14 could then operate in the selected mode with respect to setting up EN-DC service for the UE 34. Thus, if the 4G eNB 14 decided based on the load level of the 5G gNB 16 to operate in the blind-addition mode, then, based on that decision, the 4G eNB 14 could proceed directly with the SgNB-addition process to add for the UE a secondary connection with the 5G gNB 16, without requiring as a condition precedent (for so proceeding with the SgNB-addition process) that that the UE report being within threshold strong coverage of the 5G gNB 16. Whereas, if the 4G eNB 14 decided based on the load level of the 5G gNB 16 to operate in the threshold-based-addition mode, then the 4G eNB 14 could provide the UE 34 with a B1 measurement object and, if and when the 4G eNB 14 receives from the UE 34 an associated B1 measurement report indicating that the UE is within threshold strong coverage of the 5G gNB 16, the 4G eNB could then proceed with the SgNB-addition process to add for the UE a sec- ondary connection with the 5G gNB 16.

In this process, the 4G eNB 14 could apply a predefined threshold for the load level of the 5G gNB 16. This could be a load level deemed (e.g., by engineering design) to repre- sent a point where the load of the 5G gNB 16 is likely to present issues such as delays transmission or the like. For a quantity of connected UEs, the threshold level could be a particular threshold quantity of UEs, such that if the 5G gNB 16 is currently connected with at least that threshold quantity of UEs, then the 4G eNB 14 could responsively operate in the threshold-based-addition mode. And for a level of PRB utilization, the threshold level could be a particular percent- age of PRB utilization, such that if the 5G gNB's PRB utilization is at least that high, then the 4G eNB 14 could responsively operate in the threshold-based-addition mode.

Further, the 4G eNB 14 could have multiple threshold levels of load level of the 5G gNB 16 at which the 4G eNB 14 will operate in the threshold-based-addition mode with respect to adding a secondary connection with the 5G gNB 16. When a first such threshold is met, the 4G eNB 14 might responsively operate in the threshold-based-addition mode and set the B1 measurement threshold to a first level of coverage strength. When a second, higher, threshold is met, the 4G eNB 14 might also responsively operate in the threshold-based-addition mode but then set the B1 measure- ment threshold to a second, higher level of coverage strength, so that the UE 34 would need to be in stronger coverage of the 5G gNB in order to trigger adding for the UE a secondary connection with the 5G gNB 16. Further, the 4G eNB could apply additional such higher load-level thresh- olds with respective higher coverage-strength thresholds.

FIG. 2 is a flow chart depicting an example method that can be carried out to control configuration of dual connec- tivity for a UE. This method could be carried out by or for a first access node with which the UE currently has a first connection, such as by 4G eNB 14 when UE 34 is connected with 4G eNB 14 for instance.

As shown in FIG. 2, at block 38, the method includes the first access node determining a level of load of a second access node with which the UE is not currently connected.

At block 40, the method then includes the first access node using the determined level of load of the second access node as a basis to select an operational mode for use by the first access node in adding for the UE a second connection with the second access node, including (i) if the determined level of load of the second access node is at least as high as a predefined threshold level of load, then selecting as the operational mode a threshold-based-addition mode rather than a blind-addition mode and (ii) if the determined level of load of the second access node is not at least as high as the predefined threshold level of load, then selecting as the operational mode the blind-addition mode rather than the threshold-based-addition mode.

And at block 42, the method includes, based at least on the selecting, the first access node using the selected operational mode in adding for the UE the second connection with the second access node, so that the first access node would then serve the UE over the first connection concurrently with the second access node serving the UE over the second connection.

In line with the discussion above, the act of using the blind-addition mode in adding for the UE the second connection with the second access node could involve adding for the UE the second connection with the second access node without requiring, as a condition precedent, the UE reporting being within threshold strong coverage of the second access node. Whereas, using the threshold-based-addition mode in adding for the UE the second connection with the second access node could involve adding for the UE the second connection with the second access node contingent on the UE reporting being within threshold strong coverage of the second access node.

Further, the act of the UE reporting being within threshold strong coverage of the second access node could involve the UE transmitting to the first access node a measurement report indicating that the UE is within threshold strong coverage of the second access node. For instance, the first connection could be according to a first RAT (e.g., 4G LTE), the second connection could be according to a second RAT (e.g., 4G NR), the dual connectivity could be EN-DC, and the measurement report could be a B1 measurement report.

Still further, as discussed above, the predefined threshold level of load could be a first threshold level of load, and the act of using the determined level of load of the second access node as a basis to select an operational mode for use by the first access node in adding for the UE the second connection with the second access node further includes (i) if the determined level of load is at least as high as the first threshold level of load but not as high as a second threshold level of load that is higher than the first threshold level of load, then (a) selecting as the operational mode the threshold-based-addition mode and (b) applying a first coverage-strength threshold for the UE being within threshold strong coverage of the second access node, and (ii) if the determined level of load is at least as high as the second threshold level of load, then (a) selecting as the operational mode the threshold-based-addition mode and (b) applying a second coverage-strength threshold, higher than the first coverage-strength threshold, for the UE being within threshold strong coverage of the second access node.

In addition, as discussed above, the threshold level of load could be defined in terms of one or more metrics such as (i) quantity of connected UEs and/or (ii) physical-resource-block utilization, among other possibilities. And the act of the first access node determining the level of load of the second access node could involve receiving from the second access node a report of the level of load of the second access node.

FIG. 3 is next a flow chart depicting an example method that can be carried out to control configuration of dual connectivity for a UE that has a first connection with a first access node in accordance with a first RAT. This method could be carried out by the first access node, and/or by one or more other entities.

As shown in FIG. 3, at block 44, the method includes making a determination of whether a level of load of a second access node with which the UE does not yet have a connection is at least as high as a predefined threshold level of load. And at block 46, the method includes, based at least on the determination, controlling whether (i) to add for the UE a second connection with the second access node according to a second RAT without requiring as a condition precedent that the UE report being within threshold strong coverage of the second access node or rather (ii) to add for the UE the second connection with the second access node contingent on the UE reporting being within threshold strong coverage of the second access node.

Various features described above can be implemented in this context as well, and vice versa.

For example, the act of controlling based at least on the determination whether (i) to add for the UE the second connection with the second access node without requiring as a condition precedent that the UE report being within threshold strong coverage of the second access node or rather (ii) to add for the UE the second connection with the second access node contingent on the UE reporting being within threshold strong coverage of the second access node could involve (a) if the determination is that the level of load of the second access node is not at least as high as the predefined threshold level of load, then, based at least determination, engaging in a process to add for the UE the second connection with the second access node without requiring as a condition precedent that the UE report being within threshold strong coverage of the second access node, whereas (b) if the determination is that the level of load of the second access node is at least as high as the predefined threshold level of load, then, based at least on the determination, engaging in the process to add for the UE the second connection with the second access node only upon receiving from the UE a report of the UE being in threshold strong coverage of the second access node.

Further, the act of controlling, based at least on the determination, whether (i) to add for the UE the second connection with the second access node without requiring as a condition precedent that the UE report being within threshold strong coverage of the second access node or rather (ii) to add for the UE the second connection with the second access node contingent on the UE reporting being within threshold strong coverage of the second access node could additionally involve, responsive to the determination being that the level of load of the second access node is at least as high as the predefined threshold level of load, transmitting to the UE a measurement object that causes the UE to scan for coverage of the second access node and to transmit to the first access node a measurement report if and when the coverage of the second access node is at least as strong as a predefined coverage-strength threshold. For instance, if the first access node operates under a first RAT and the second access node operates under a second RAT, then measurement object could be a B1 measurement object that causes the UE to scan for coverage under the second RAT and provide a B1 measurement report if and when the UE detects threshold strong coverage under the second RAT.

Figure 4:
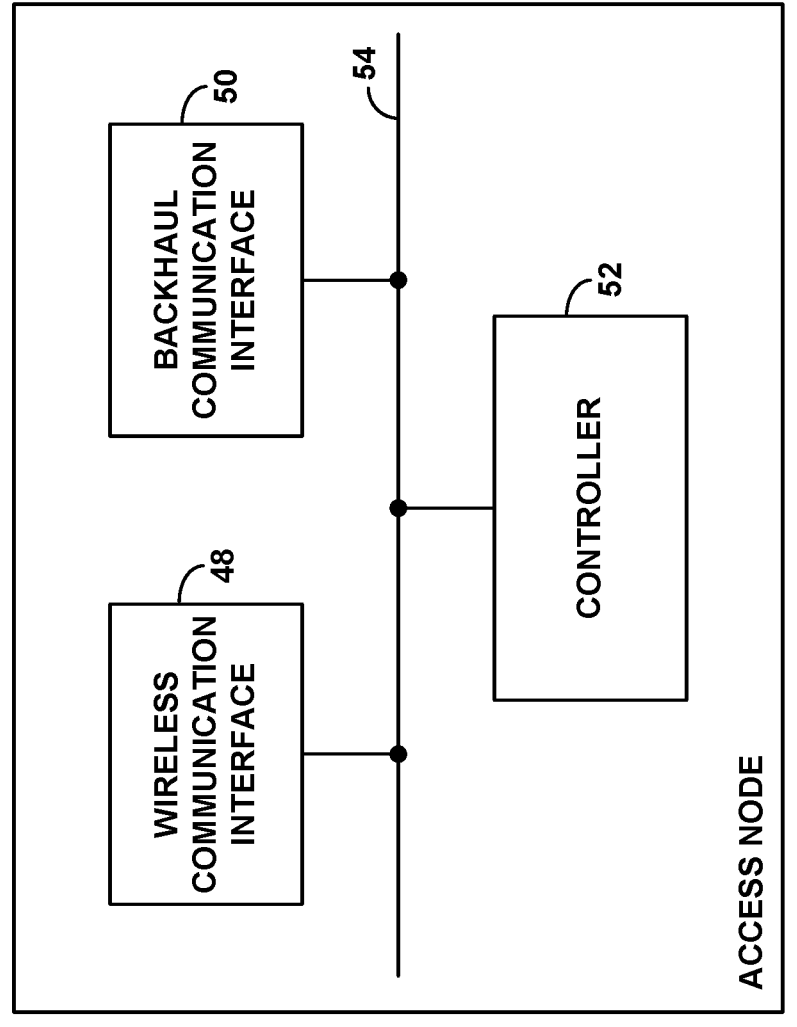
FIG. 4 is a simplified block diagram of an example access node operable in accordance with the disclosure.

FIG. 4 is a simplified block diagram of an example first access node, such as 4G eNB 14, showing some of the components that could be included in the access node in a non-limiting example implementation. As shown, the example first access node includes a wireless communication interface 48, a backhaul communication interface 50, and a controller 52, which could be integrated together in various ways (e.g., on a chipset) and/or interconnected by a system bus, network, or other communication mechanism 54 as shown.

The wireless communication interface 48 could include a radio and antenna structure through which the first access node could be configured to engage in air-interface communication and serve UEs according to a first RAT. And the backhaul communication interface 50 could comprise a wired or wireless network communication module, such as an Ethernet interface, through which to communicate with other entities, perhaps with the second access node and/or with one or more other entities on or via a core network.

Further, the controller 52 could comprise a processing unit (e.g., one or more processing units such as microprocessors and/or specialized processors), non-transitory data storage (e.g., one or more volatile and/or non-volatile storage components, such as magnetic, optical, or flash storage), and program instructions stored in the data storage and executable by the processing unit to carry out, or cause the first access node to carry out, various operations as described herein.

Various features discussed above can be implemented in this context as well, and vice versa.

For instance, the controller could be configured to control configuration of dual connectivity of a UE when the UE has a first connection with the first access node in accordance with the first RAT, such as by making a determination of whether a level of load of a second access node with which the UE is not yet connected is at least as high as a predefined threshold level of load, and, based at least on the determination, controlling whether to require, as a condition precedent to adding for the UE a second connection with the second access node according to a second RAT, that the UE report being within threshold strong coverage of the second access node.

In line with the discussion above, the act of controlling, based on the determination, whether to require, as the condition precedent to adding for the UE the second connection with the second access node, that the UE report being within threshold strong coverage of the second access node could involve requiring, as the condition precedent to adding for the UE a second connection with the second access node according to a second RAT, that the UE report being within threshold strong coverage of the second access node, with the requiring occurring if and only if the determination is that the level of load of the second access node is at least as high as the predefined threshold level of load.

Further, as discussed above, the act of requiring, as the condition precedent to adding for the UE a second connection with the second access node according to a second RAT, that the UE report being within threshold strong coverage of the second access node could involve transmitting to the UE a measurement object that causes the UE to scan for coverage of the second access node and to transmit to the first access node a measurement report with the transmitting of the measurement report occurring if and when the UE determines that the coverage of the second access node is at least as strong as a predefined coverage-strength threshold.

The present disclosure also contemplates a non-transitory computer-readable medium having encoded thereon (e.g., storing, embodying, containing, or otherwise incorporating) program instructions executable to cause a processing unit to carry out operations such as those described above.

Further, while the foregoing focuses on dual connectivity defined as involving service concurrently on two or more different RATs, the features described could extend as well to apply with respect to a single RAT, such as where a UE is connected with a first access node under a given RAT and at issue is adding for the UE of a second connection under the same RAT with a second access node to facilitate having the UE be served concurrently by both access nodes under that RAT.

Exemplary embodiments have been described above. Those skilled in the art will understand, however, that changes and modifications may be made to these embodiments without departing from the true scope and spirit of the invention.

We claim:

1. A method for controlling configuration of dual connectivity for a user equipment device (UE) that has a first connection with a first access node in accordance with a first radio access technology (RAT), the method comprising:

determining whether a first load measurement of a second access node with which the UE does not yet have a connection is equal to or greater than a first threshold, the first load measurement being indicative of a percentage of physical resource blocks (PRBs) allocated to an air-interface of the second access node in a preset time period;

in response to the first load measurement being less than the first threshold, configuring the first access node to operate in a blind addition mode to add a second connection in accordance with a second RAT to connect the UE to the second access node;

determining that a second load measurement of the second access node is equal to or greater than an additional threshold, the second load measurement being indicative of a quantity of second UEs connected to the second access node; and in response to the first load measurement of the second access node being equal to or greater than the first threshold and the second load measurement being equal to or greater than the additional threshold, configuring the first access node to operate in a threshold-based addition mode, including:

obtaining a measurement report from the UE, the measurement report indicating a coverage strength of the UE under the second access node is equal to or greater than a second threshold, adjusting, based at least in part on the first load measurement of the second access node, the second threshold to an adjusted second threshold, determining that the coverage strength of the UE under the second access node is equal to or greater than the adjusted second threshold, and based on the coverage strength being greater than the adjusted second threshold, adding the second connection in accordance with the second RAT to connect the UE to the second access node.

2. The method of claim 1, wherein the method is carried out by the first access node.

3. The method of claim 1, further comprising:

transmitting, to the UE, a measurement object that causes the UE to:

scan for the coverage strength of the second access node, and transmit, to the first access node, the measurement report when the coverage under the second access node is equal to or greater than the second threshold.

4. The method of claim 3, wherein the measurement object is an inter-RAT measurement object, and wherein the measurement report is an inter-RAT measurement report.

5. The method of claim 1, wherein adjusting, based at least in part on the first load measurement of the second access node, the second threshold to the adjusted second threshold further comprises:

when the first load measurement of the second access node satisfies a third threshold greater than the first threshold, increasing the second threshold to an increased second threshold.

6. The method of claim 5, further comprising:

adding the second connection in accordance with the second RAT to connect the UE to the second access node when the coverage strength of the UE under the second access node is equal to or greater than the increased second threshold.

7. The method of claim 1, wherein the blind addition mode indicates that the second connection in accordance with the second RAT is added to the UE without requiring the coverage strength of the UE under the second access node is equal to or greater than the second threshold.

8. A first access node comprising:

a wireless communication interface through which the first access node is configured to engage in air-interface communication according to a first radio access technology (RAT);

a backhaul communication interface; and a controller that performs operations to configure dual connectivity of a user equipment device (UE) when the UE has a first connection with the first access node in accordance with the first RAT, the operations including:

determining whether a first load measurement of a second access node with which the UE is not yet connected is equal to or greater than a first threshold, the first load measurement being indicative of a percentage of physical resource blocks (PRBs) allocated to an air-interface of the second access node in a preset time period, in response to the first load measurement being less than the first threshold, configuring the first access node to operate in a blind addition mode to add a second connection in accordance with a second RAT to connect the UE to the second access node, determining that a second load measurement of the second access node is equal to or greater than an additional threshold, the second load measurement being indicative of a quantity of second UEs connected to the second access node, and in response to the first load measurement of the second access node being equal to or greater than the first threshold and the second load measurement being equal to or greater than the additional threshold, configuring the first access node to operate in a threshold-based addition mode, including:

obtaining a measurement report from the UE, the measurement report indicating a coverage strength of the UE under the second access node is equal to or greater than a second threshold, adjusting, based at least in part on the first load measurement of the second access node, the second threshold to an adjusted second threshold, determining that the coverage strength of the UE under the second access node is equal to or greater than the adjusted second threshold, and based on the coverage strength being greater than the adjusted second threshold, adding the second connection in accordance with the second RAT to connect the UE to the second access node.

9. The first access node of claim 8, wherein the operations further include:

transmitting, to the UE, a measurement object that causes the UE to:

scan for the coverage under the second access node, and transmit, to the first access node, the measurement report when the coverage under the second access node is equal to or greater than the second threshold.

10. The first access node of claim 8, wherein the first RAT is 4G LTE, the second RAT is 5G NR, and the dual connectivity is EUTRA-NR dual connectivity (EN-DC).

11. The first access node of claim 8, wherein the blind addition mode indicates that the second connection in accordance with the second RAT is added to the UE without requiring the coverage strength of the UE under the second access node is equal to or greater than the second threshold.

12. The first access node of claim 8, wherein adjusting, based at least in part on the first load measurement of the second access node, the second threshold to the adjusted second threshold further comprises:

when the first load measurement of the second access node satisfies a third threshold greater than the first threshold, increasing the second threshold to an increased second threshold.

13. The first access node of claim 12, wherein the operations further include:

adding the second connection in accordance with the second RAT to connect the UE to the second access node when the coverage of the UE under the second access node is equal to or greater than the increased second threshold.

14. A non-transitory computer-readable medium storing instructions for controlling configuration of dual connectivity for a user equipment device (UE) that has a first connection with a first access node in accordance with a first radio access technology (RAT), that when executed by a processor, cause the processor to perform operations comprising:

determining whether a first load measurement of a second access node with which the UE does not yet have a connection is to or greater than a first threshold;

in response to the first load measurement being less than the first threshold, configuring the first access node to operate in a blind addition mode to add a second connection in accordance with a second RAT to connect the UE to the second access node;

determining that a second load measurement of the second access node is equal to or greater than an additional threshold, the second load measurement being indicative of a quantity of second UEs connected to the second access node; and in response to the first load measurement of the second access node being equal to or greater than the first threshold and the second load measurement being equal to or greater than the additional threshold, configuring the first access node to operate in a threshold-based addition mode, including:

obtaining a measurement report from the UE, the measurement report indicating a coverage strength of the UE under the second access node is equal to or greater than a second threshold, adjusting, based at least in part on the first load measurement of the second access node, the second threshold to an adjusted second threshold, determining that the coverage strength of the UE under the second access node is equal to or greater than the adjusted second threshold, and based on the coverage strength being greater than the adjusted second threshold, adding the second connection in accordance with the second RAT to connect the UE to the second access node.

15. The non-transitory computer-readable medium of claim 14, wherein the operations further include:

transmitting, to the UE, a measurement object that causes the UE to:

scan for the coverage strength under the second access node, and transmit, to the first access node, the measurement report when the coverage under the second access node is equal to or greater than the second threshold.

16. The non-transitory computer-readable medium of claim 14, wherein adjusting, based at least in part on the first load measurement of the second access node, the second threshold to the adjusted second threshold further include:

when the first load measurement of the second access node satisfies a third threshold greater than the first threshold, increasing the second threshold to an increased second threshold; and adding the second connection in accordance with the second RAT to connect the UE to the second access node when the coverage strength of the UE under the second access node is equal to or greater than the increased second threshold.

\* \* \* \* \*